United States Patent
Fujimoto et al.

(10) Patent No.: US 9,550,417 B2
(45) Date of Patent: Jan. 24, 2017

(54) SADDLE-RIDING TYPE VEHICLE

(71) Applicant: HONDA MOTOR CO., LTD., Tokyo (JP)

(72) Inventors: Yasushi Fujimoto, Wako (JP); Kinya Mizuno, Wako (JP); Hiroyuki Sugiura, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 14/668,101

(22) Filed: Mar. 25, 2015

(65) Prior Publication Data

US 2015/0274011 A1     Oct. 1, 2015

(30) Foreign Application Priority Data

Mar. 31, 2014 (JP) ................................. 2014-071773

(51) Int. Cl.
| | |
|---|---|
| *B60K 17/08* | (2006.01) |
| *F16H 61/32* | (2006.01) |
| *F16H 63/18* | (2006.01) |
| *F16H 3/00* | (2006.01) |
| *F16H 3/089* | (2006.01) |
| *F16H 3/16* | (2006.01) |

(52) U.S. Cl.
CPC ............... *B60K 17/08* (2013.01); *F16H 61/32* (2013.01); *F16H 63/18* (2013.01); *F16H 3/006* (2013.01); *F16H 3/089* (2013.01); *F16H 3/16* (2013.01); *F16H 2200/0056* (2013.01)

(58) Field of Classification Search
CPC .......... B60K 17/06; B60K 17/04; B60K 17/08
USPC .......................................................... 180/230
See application file for complete search history.

(56) References Cited

U.S. PATENT DOCUMENTS

| | | | | |
|---|---|---|---|---|
| 6,370,977 | B1* | 4/2002 | Kubo .................. | F16H 57/0006 74/339 |
| 6,832,590 | B2* | 12/2004 | Hattori ................... | F02B 61/02 123/195 R |
| 7,967,724 | B2* | 6/2011 | Kojima ............... | F16H 61/0213 477/900 |
| 8,015,891 | B2* | 9/2011 | Ogasawara ............ | B60K 17/08 123/197.1 |
| 8,150,587 | B2* | 4/2012 | Tomoda ................ | F16D 25/086 701/51 |

(Continued)

FOREIGN PATENT DOCUMENTS

JP     2010-196855 A     9/2010

*Primary Examiner* — Kevin Hurley
*Assistant Examiner* — Michael Stabley
(74) *Attorney, Agent, or Firm* — Birch, Stewart, Kolasch & Birch, LLP (57) ABSTRACT

A saddle-riding type vehicle wherein an electric power transmission apparatus is rendered compact and a clearance is kept between a front wheel and a shift motor in a structure wherein a change mechanism and the shift motor are disposed in a forward direction of a power unit. A change mechanism for selectively establishing a gear stage of a transmission and a shift motor for supplying rotational power to the change mechanism are disposed in a forward direction of a power unit. A speed reducer gear mechanism for reducing the speed of the rotational power from the shift motor is disposed in a forward direction of a transmission compartment. The shift motor is disposed such that a main motor body thereof is positioned rearwardly of the speed reducer gear mechanism.

13 Claims, 7 Drawing Sheets

(56) References Cited

U.S. PATENT DOCUMENTS

| | | | | |
|---|---|---|---|---|
| 8,166,933 B2* | 5/2012 | Fujimoto | ............... | F01L 1/143 |
| | | | | 123/196 A |
| 8,245,588 B2* | 8/2012 | Ogasawara | ............. | F16H 61/28 |
| | | | | 74/335 |
| 8,250,939 B2* | 8/2012 | Hayakawa | .............. | F16H 63/18 |
| | | | | 74/335 |
| 8,360,218 B2* | 1/2013 | Fujimoto | ............ | F16D 25/0638 |
| | | | | 192/48.611 |
| 8,387,477 B2* | 3/2013 | Ieda | ........................ | F16H 63/14 |
| | | | | 74/335 |
| 8,408,086 B2* | 4/2013 | Takeuchi | ............. | F16D 1/0858 |
| | | | | 74/335 |
| 8,567,276 B2* | 10/2013 | Saitoh | ................... | B62K 11/04 |
| | | | | 74/340 |
| 2005/0229894 A1* | 10/2005 | Okano | ................... | F02B 61/02 |
| | | | | 123/197.1 |

* cited by examiner

SADDLE-RIDING TYPE VEHICLE

CROSS-REFERENCE TO RELATED APPLICATIONS

The present application claims priority under 35 USC 119 to Japanese Patent Application No. 2014-071773 filed Mar. 31, 2014 the entire contents of which are hereby incorporated by reference.

BACKGROUND OF THE INVENTION

1. Field of the Invention

The present invention relates to a saddle-riding type vehicle having a power unit which incorporates an electric power transmission apparatus.

2. Description of Background Art

Heretofore, a transmission mechanism for actuating a transmission in a motorcycle is known wherein an electric power transmission apparatus for changing gears is provided with an electric motor. See, for example, Japanese Patent Laid-Open No. 2010-196855. The transmission mechanism includes the electric motor as a gearshift motor for supplying power to change the gears of the transmission, a gear set as a speed reducer gear mechanism for reducing the rotational speed of the electric motor, and a screw as a change mechanism for angularly moving a shift drum through a prescribed angle to change the gears.

More specifically, a longitudinally oriented internal combustion engine includes a crankshaft extending along the longitudinal direction of the vehicle and the transmission that is integrally combined with the crankshaft to make up a power unit. The screw that actuates the transmission is disposed in a front portion of the power unit with the electric motor that supplies rotational power to the screw being disposed in front of a transmission case for housing the transmission and immediately behind the front wheel of the vehicle. With this structure, the change mechanism including the screw, etc. and the electric motor are disposed close to the front portion of the power unit, making it possible to render the electric power transmission apparatus compact.

According to the structure disclosed in Japanese Patent Laid-Open No. 2010-196855, the power unit is shaped such that in a side view of the vehicle, the front face of an upper portion of the power unit wherein the internal combustion engine is disposed projects more than the front face of a lower portion thereof wherein the transmission is disposed, providing a cavity in front of the lower portion of the power unit. The shift motor is placed in the cavity, with a clearance defined between the front wheel and the shift motor. Therefore, when the vehicle is suddenly braked, the front wheel and the shift motor are prevented from contacting each other, and pebbles which may come flying from the front wheel are less likely to hit the shift motor.

However, depending on the internal structures and layout of the internal combustion engine and the transmission, it is difficult in some instances to provide the cavity in front face of the power unit. According to the layout of a conventional electric power transmission apparatus, if attempts are made to render the electric power transmission apparatus compact by clustering the shift motor and the change mechanism in a forward direction of the power unit, then it is difficult to define the clearance between the front wheel and the shift motor.

SUMMARY AND OBJECTS OF THE INVENTION

An embodiment of the present invention has been made in view of the above problems. It is an object of an embodiment of the present invention to provide a saddle-riding type vehicle in which an electric power transmission apparatus is rendered compact and a clearance is kept between a front wheel and a shift motor in a structure wherein a change mechanism and the shift motor are disposed in a forward direction of a power unit.

According to an embodiment of the present invention, a saddle-riding type vehicle includes a power unit having an internal combustion engine and a transmission coupled to the internal combustion engine with a vehicle body frame for supporting the power unit with a crankshaft oriented in longitudinal direction of the vehicle. A front fork is steerably supported on the vehicle body frame with a front wheel rotatably supported on the front fork. A transmission compartment is defined in the power unit for housing the transmission therein with a change mechanism being disposed in a forward direction of the power unit, for selectively establishing a gear stage of the transmission. A shift motor is provided for supplying rotational power to the change mechanism. The shift motor is disposed rearwardly of the front wheel closely to a front portion of the power unit, wherein a speed reducer gear mechanism for reducing the speed of the rotational power from the shift motor is disposed in a forward direction of the transmission compartment, the shift motor is disposed such that a main motor body thereof is positioned rearwardly of the speed reducer gear mechanism.

According to an embodiment of the present invention, the main motor body of the shift motor is disposed in overlapping relation to the transmission compartment as viewed in a side elevation of the vehicle.

According to an embodiment of the present invention, the speed reducer gear mechanism includes a speed reducer cover covering the speed reducer gear mechanism, and the shift motor has a portion covered with the speed reducer cover as seen in a front view of the vehicle.

According to an embodiment of the present invention, the speed reducer gear mechanism is displaced to one side in a widthwise direction of the vehicle off a widthwise center of the front wheel.

According to an embodiment of the present invention, the shift motor is disposed inwardly of an outer edge, as seen in a front view of the vehicle, of a lower portion of the power unit.

According to an embodiment of the present invention, the change mechanism for selectively establishing a gear stage of the transmission and the speed reducer gear mechanism are disposed in a forward direction of the power unit, and the shift motor is disposed rearwardly of the speed reducer gear mechanism. Therefore, the shift motor does not project in a forward direction of the power unit, with a clearance being kept between the front wheel and the shift motor. The change mechanism, the speed reducer gear mechanism, and the shift motor that make up an electric power transmission apparatus are clustered in a forward direction of the power unit, making it possible to render the electric power transmission apparatus compact.

According to an embodiment of the present invention, the shift motor has its main motor body disposed in overlapping relation to the transmission compartment as seen in the side view of the vehicle. The main motor body thus does not project in a forward direction of the transmission compartment in a longitudinal direction of the vehicle, so that the clearance is kept between the front wheel and the shift motor. The electric power transmission apparatus can thus be further rendered compact along the longitudinal direction of the vehicle.

According to an embodiment of the present invention, the speed reducer gear mechanism includes the speed reducer cover that covers the speed reducer gear mechanism, and the shift motor has the portion covered with the speed reducer cover as seen in the front view of the vehicle. Consequently, there is no need for a separate cover member for protecting the shift motor, but the speed reducer cover is effective to protect the shift motor from pebbles that may come flying from the front wheel. The shift motor and the speed reducer gear mechanism are rendered compact, making it possible to render the electric power transmission apparatus further compact.

According to an embodiment of the present invention, since the speed reducer gear mechanism is displaced to one side in the widthwise direction of the vehicle off the widthwise center of the front wheel, the components of the electric power transmission apparatus are clustered in the front portion of the power unit, while maintaining the clearance between the front wheel and the shift motor that is disposed behind the speed reducer gear mechanism.

According to an embodiment of the present invention, inasmuch as the shift motor is disposed inwardly of the outer edge, as seen in the front view of the vehicle, of the lower portion of the power unit, the electric power transmission apparatus can be rendered further compact. A bank angle that is formed by the vehicle at the time the vehicle makes a turn is not limited by the shift motor, and hence is kept as desired.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

A motorcycle 2 as a saddle-riding type vehicle according to the present invention will be described below with reference to FIGS. 1 through 7.

Figure 1:
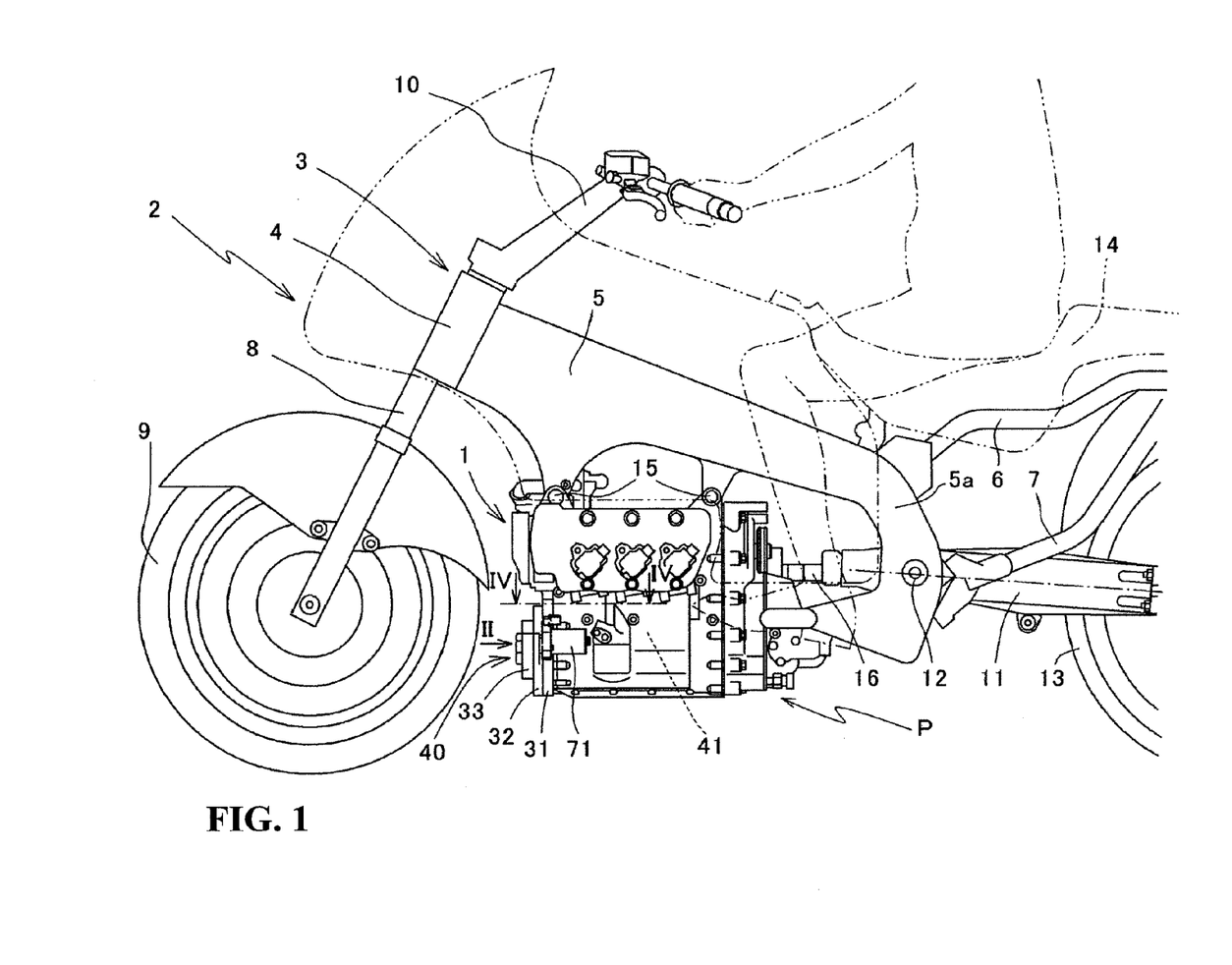
FIG. 1 is a left side elevational view, partly omitted from illustration, of a motorcycle according to an embodiment of the present invention.

FIG. 1 is a left side elevational view, partly omitted from illustration, of the motorcycle 2 according to an embodiment of the present invention. In FIG. 1, intake and exhaust systems, a fuel system, etc. are omitted from illustration.

In the present description and the scope of claims for patent, the directions such as forward, rearward, leftward, and rightward directions shall be in conformity with the normal standards according to the direction of operation of the motorcycle 2 wherein straight ahead is regarded as a forward direction.

As shown in FIG. 1, the motorcycle 2 has a vehicle body that has a vehicle body frame 3 including a pair of left and right main frames 5 extending slightly obliquely downwardly and rearwardly from a head pipe 4 on a front portion of the vehicle body and having end portions extending downwardly through bent portions 5a, a pair of seat rails 6 extending slightly obliquely upwardly and rearwardly from the bent portions 5a of the main frames 5, and a pair of back stays 7 interconnecting rear portions of the seat rails 6 and lower portions of the bent portions 5a of the main frames 5.

A front fork 8 extends downwardly from the head pipe 4 and is steerably supported on the head pipe 4. The front fork 8 supports a front wheel 9 rotatably on the lower end thereof. A steering handle 10 is integrally coupled to the upper end of the front fork 8.

Swing arms 11 that extend rearwardly have front end portions vertically swingably supported by a pivot shaft 12 on lower portions of the bent portions 5a of the main frames 5. A rear wheel 13 is rotatably supported on rear end portions of the swing arms 11.

Shock absorbers, not shown, are connected between the bent portions 5a of the main frames 5 and the swing arms 11. A rider's seat 14 is mounted on upper portions of the seat rails 6.

A power unit P for rotating the rear wheel 13 is disposed below the main frames 5. The power unit P is mounted on the motorcycle 2 by a plurality of mount brackets 15.

Figure 2:
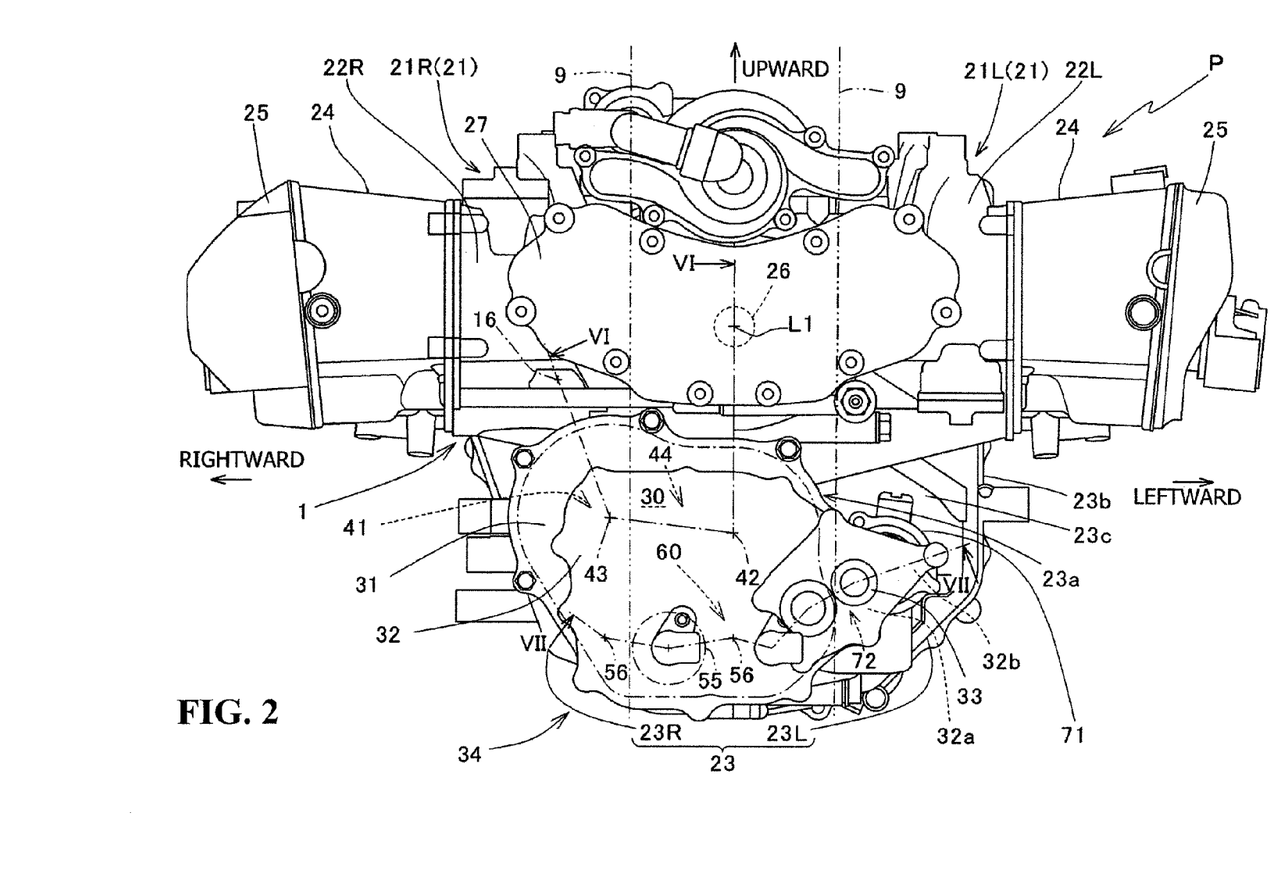
FIG. 2 is a front elevational view, partly omitted from illustration, of a power unit as viewed along an arrow II in FIG. 1.
Figure 3:
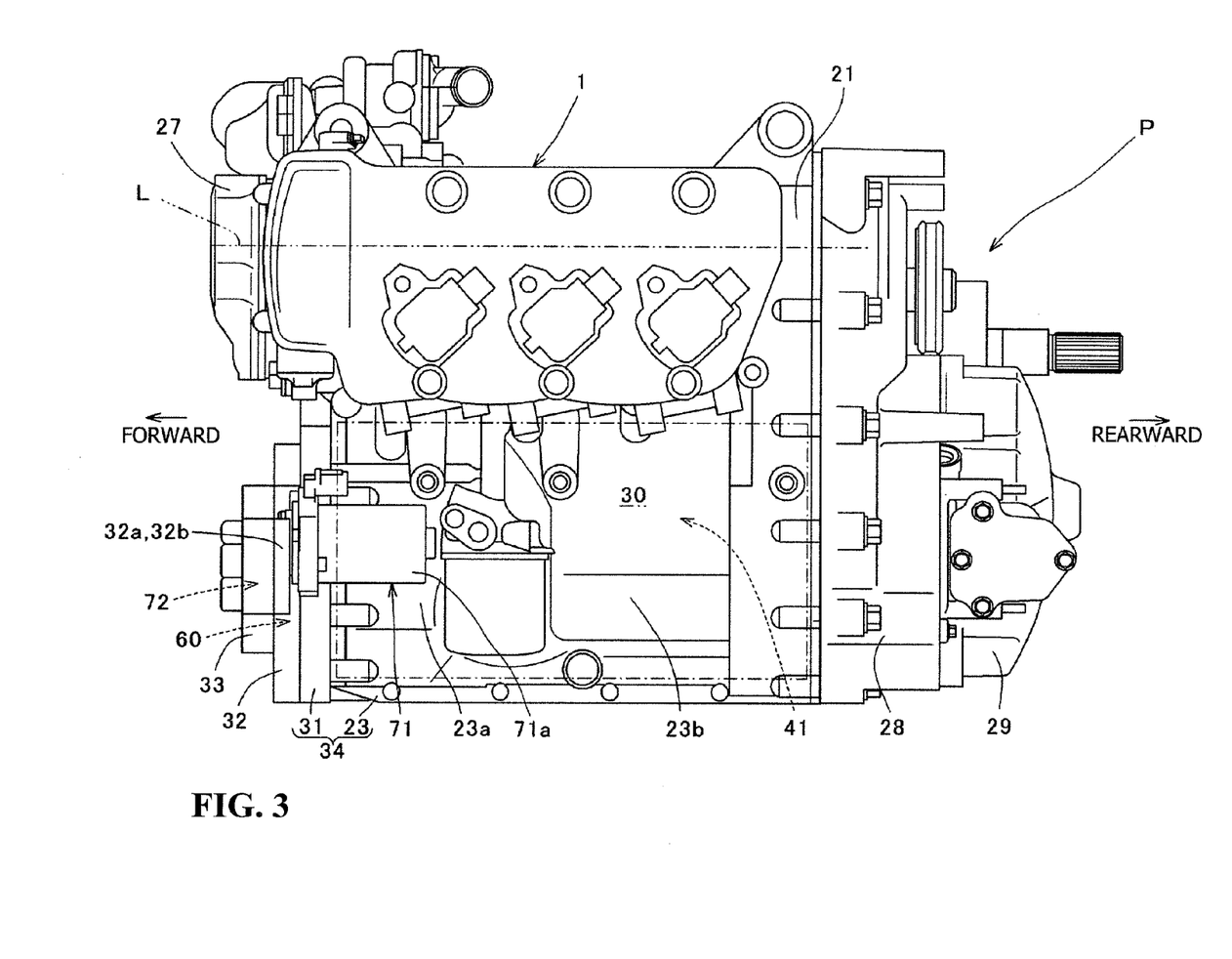
FIG. 3 is a left side elevational view, partly omitted from illustration, of the power unit shown in FIG. 2.

FIG. 2 is a front elevational view, partly omitted from illustration, of the power unit P as viewed along an arrow II in FIG. 1. FIG. 3 is a left side elevational view, partly omitted from illustration, of the power unit P shown in FIG. 1. In FIG. 2, the two two-dot-and-dash lines that extend vertically represent left and right end faces, respectively, of the front wheel 9.

As shown in FIGS. 2 and 3, the power unit P that is mounted on the motorcycle 2 according to the present embodiment includes a longitudinally oriented and horizontally opposed 6-cylindrical water-cooled 4-stroke-cycle internal combustion engine 1 whose crankshaft 26 extends along the longitudinal direction of the motorcycle 2, and a transmission 41 coupled to the internal combustion engine 1 for transmitting power of the internal combustion engine 1 through a selected gear. The transmission 41 changes gears by rotating a shift drum 55 with an electric power transmission apparatus 40 that has a shift motor 71 to be described later.

As shown in FIG. 2, the internal combustion engine 1 has a left engine block 21L disposed on a left side as viewed in the forward direction along which the motorcycle 2 normally is operated, a right engine block 21R disposed on a right side as viewed in the forward direction, a pair of cylinder heads 24 joined respectively to the left and right ends of the left and right engine blocks 21L and 21R, and a pair of head covers 25 disposed respectively over the cylinder heads 24.

The left engine block 21L includes a left cylinder block 22L and a left crankcase 23L integrally combined with the left cylinder block 22L. The right engine block 21R includes a right cylinder block 22R and a right crankcase 23R integrally combined with the right cylinder block 22R. The left crankcase 23L and the right crankcase 23R jointly make up a crankcase 23.

As also shown in FIG. 3, the crankshaft 26, which is positioned in an upper portion of an engine block 21 made up of the left and right engine blocks 21L and 21R, is rotatably supported between the left crankcase 23L and the right crankcase 23R and has an axis L1 oriented along the longitudinal direction of the motorcycle 2.

As shown in FIG. 2, pistons (not shown) in the left and right engine blocks 21L and 21R are operatively connected to the crankshaft 26 by connecting rods (not shown). The crankshaft 26 is rotated about its own axis by the pistons that are forced to move slidingly when the air-fuel gas is combusted in combustion chambers (not shown) defined in the left and right engine blocks 21L and 21R.

As shown in FIGS. 2 and 3, a front cover 27 is mounted on the front faces of upper portions of the left and right engine blocks 21L and 21R in a covering relation with respect to the front faces of the upper portions of the left and right engine blocks 21L and 21R around the crankshaft 26. The left crankcase 23L and the right crankcase 23R define therebetween a transmission compartment 30 that houses a transmission 41 to be described later therein in lower portions of the left and right engine blocks 21L and 21R. The transmission compartment 30 is indicated by the dot-and-dash lines.

Figure 4:
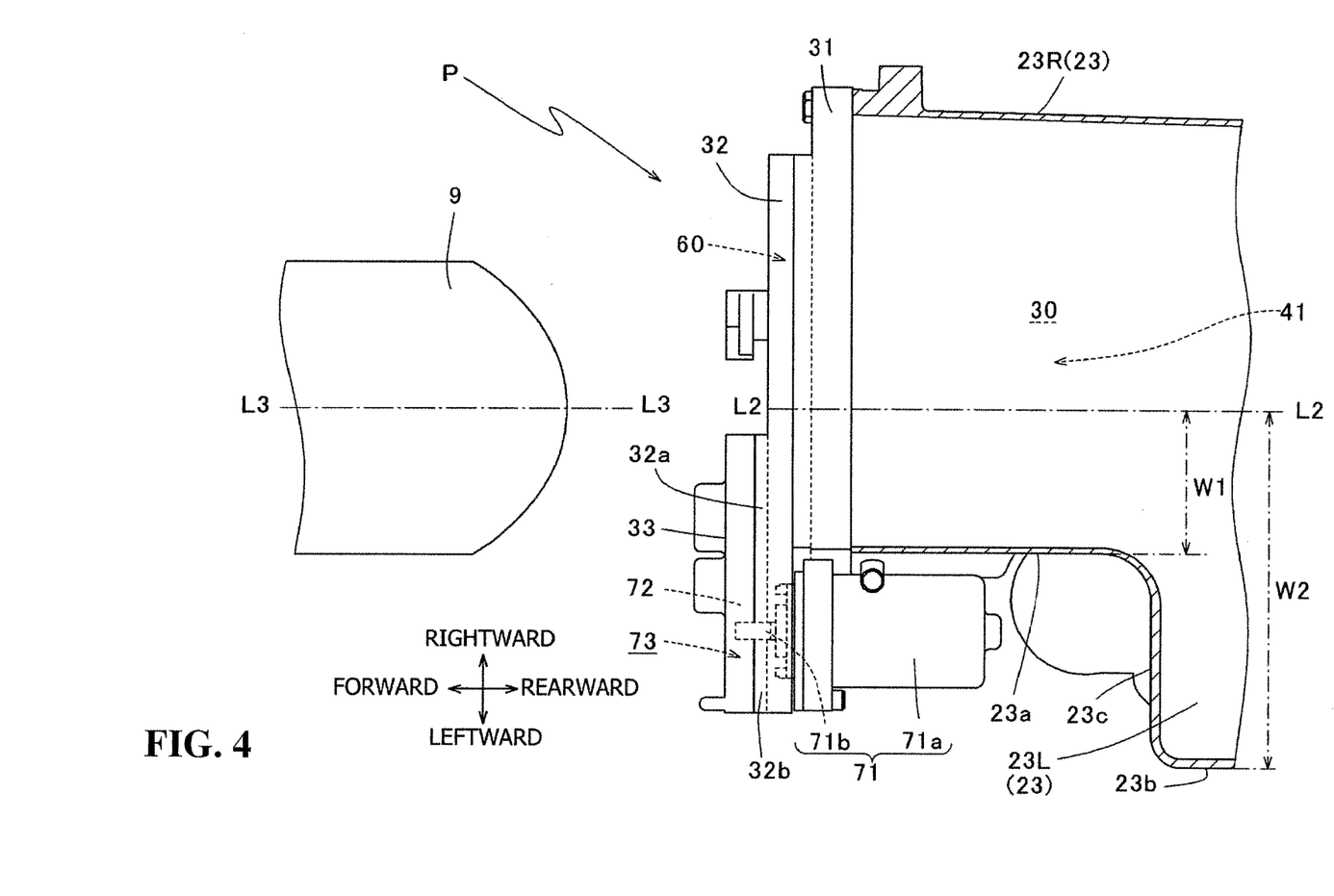
FIG. 4 is a fragmentary cross-sectional view taken along line IV-IV of FIG. 1, with the inside of a transmission case being omitted from illustration.

FIG. 4 is a fragmentary cross-sectional view taken along line IV-IV of FIG. 1, with the inside of a transmission case being omitted from illustration. In FIG. 4, the front wheel 9 is illustrated in its outer profile as viewed in a plan view.

As shown in FIGS. 2 and 4, the crankcase 23 that defines therein the transmission compartment 30 that is positioned in a lower portion of the engine block 21 has such a transverse width that the left and right crankcases 23L and 23R are of substantially equal transverse dimensions in a rear portion of the crankcase 23 whereas the left crankcase 23L is narrower in a front portion of the crankcase 23. More specifically, as shown in FIG. 4, a width W1 from a central line L2 along the longitudinal direction of the vehicle to a front left side surface 23a of the left crankcase 23L is smaller than a width W2 from the central line L2 along the longitudinal direction of the vehicle to a rear left side surface 23b of the left crankcase 23L. The transmission compartment 30 is displaced to the right off the center of the power unit P.

As shown in FIG. 3, a rear cover 28 is mounted on a rear portion of the engine block 21 with a clutch cover 29 being mounted on the rear end of a lower center portion of the rear cover 28.

As shown in FIGS. 2 and 3, a transmission holder 31 is mounted on a front portion of the crankcase 23 which is in a lower portion of the engine block 21 in a covering relation relative to a front region of the transmission compartment 30. On a rear surface of the transmission holder 31, there are disposed a gear transmission mechanism 44, a main shaft 42, a countershaft 3, a shift drum 55, and a pair of shift fork shafts 56 that are integrally assembled compactly as a cassette unit. The cassette unit is inserted into the transmission compartment 30 that is defined by the left crankcase 23L and the right crankcase 23R, and the transmission holder 31 is mounted on a front surface of the crankcase 23 in a covering relation relative to the front region of the transmission compartment 30, so that the crankcase 23 and the transmission holder 31 jointly make up a transmission case 34. The cassette unit thus used allows the gear transmission mechanism 44, the main shaft 42, the countershaft 43, the shift drum 55, and the shift fork shafts 56 to be installed to the crankcase 23 with ease.

As shown in FIGS. 2 through 4, a change system holder 32 for holding a change mechanism 60 for operating the gears of the transmission 41 is mounted on a front surface of the transmission holder 31 and extends from a central portion to a lower portion of the transmission holder 31.

Figure 5:
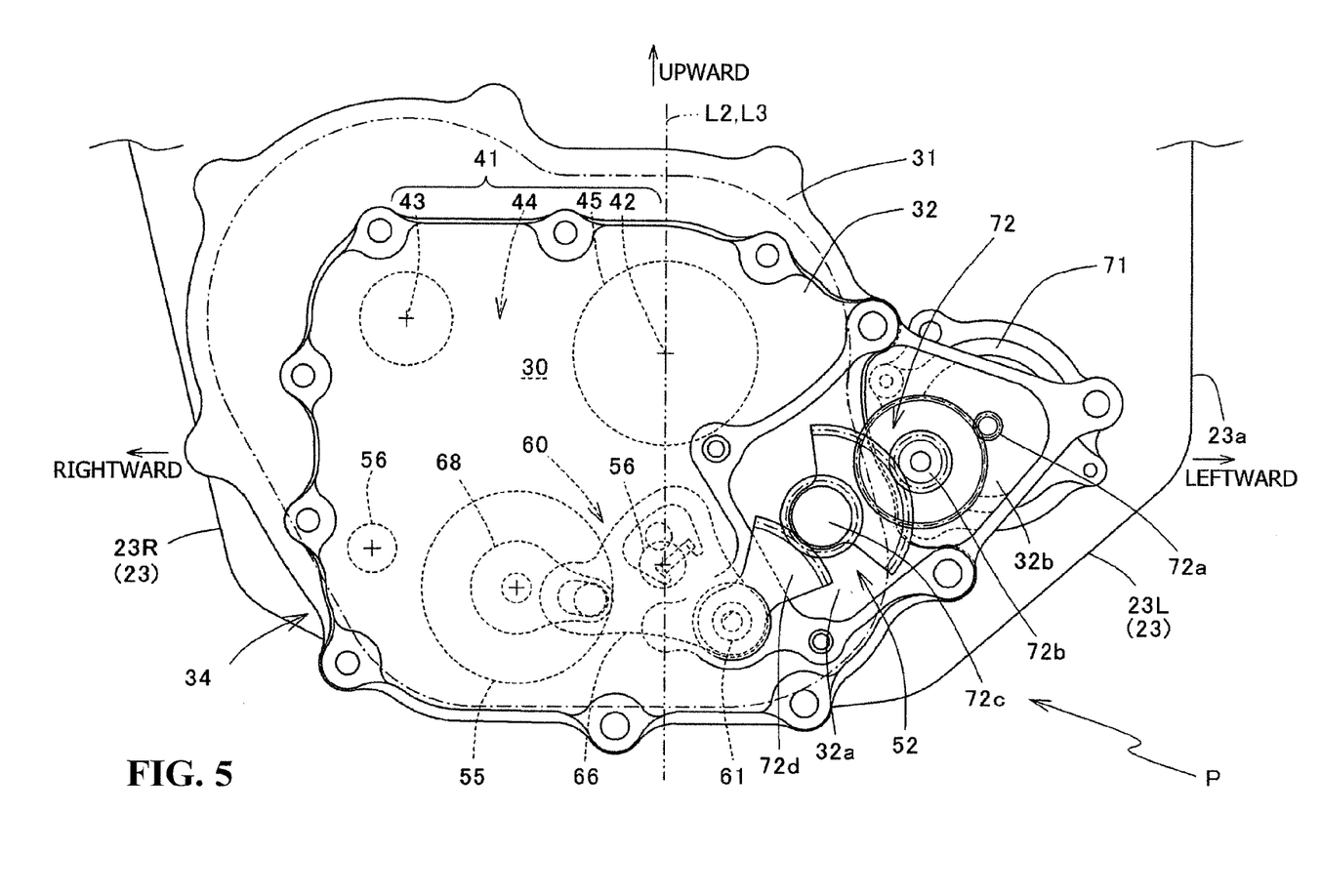
FIG. 5 is an enlarged front elevational view showing a portion of a crankcase in a lower portion of the power unit shown in FIG. 2, with a speed reducer cover removed.

FIG. 5 is an enlarged front elevational view showing a portion of the crankcase 23 in a lower portion of the power unit P shown in FIG. 2, with a speed reducer cover 33 removed.

As shown in FIG. 5, a speed reducer holder 32a is integrally combined with a left portion of the change system holder 32, and has a substantially left half projecting as a projection 32b to the left from the transmission holder 31 as seen in a front view of the vehicle.

As shown in FIG. 4, the speed reducer cover 33 is mounted on a front surface of the speed reducer holder 32a. A speed reducer gear mechanism 72 to be described later is disposed in a speed reducer compartment 73 that is surrounded by the speed reducer holder 32a and the speed reducer cover 33.

As shown in FIGS. 2, 3, 6, and 7, the main shaft 42, the countershaft 43, the shift fork shafts 56, and the shift drum 55 that are inserted in the transmission compartment 30 are disposed parallel to the crankshaft 26. As shown in FIG. 2, the main shaft 42 is disposed below the crankshaft 26, and the countershaft 43 is disposed rightwardly of the main shaft 42. The shift drum 55 is disposed centrally in a lower portion of the transmission compartment 30. The two shift fork shafts 56 are disposed leftwardly and rightwardly of the shift drum 55 and below the main shaft 42 and the countershaft 43.

Figure 6:
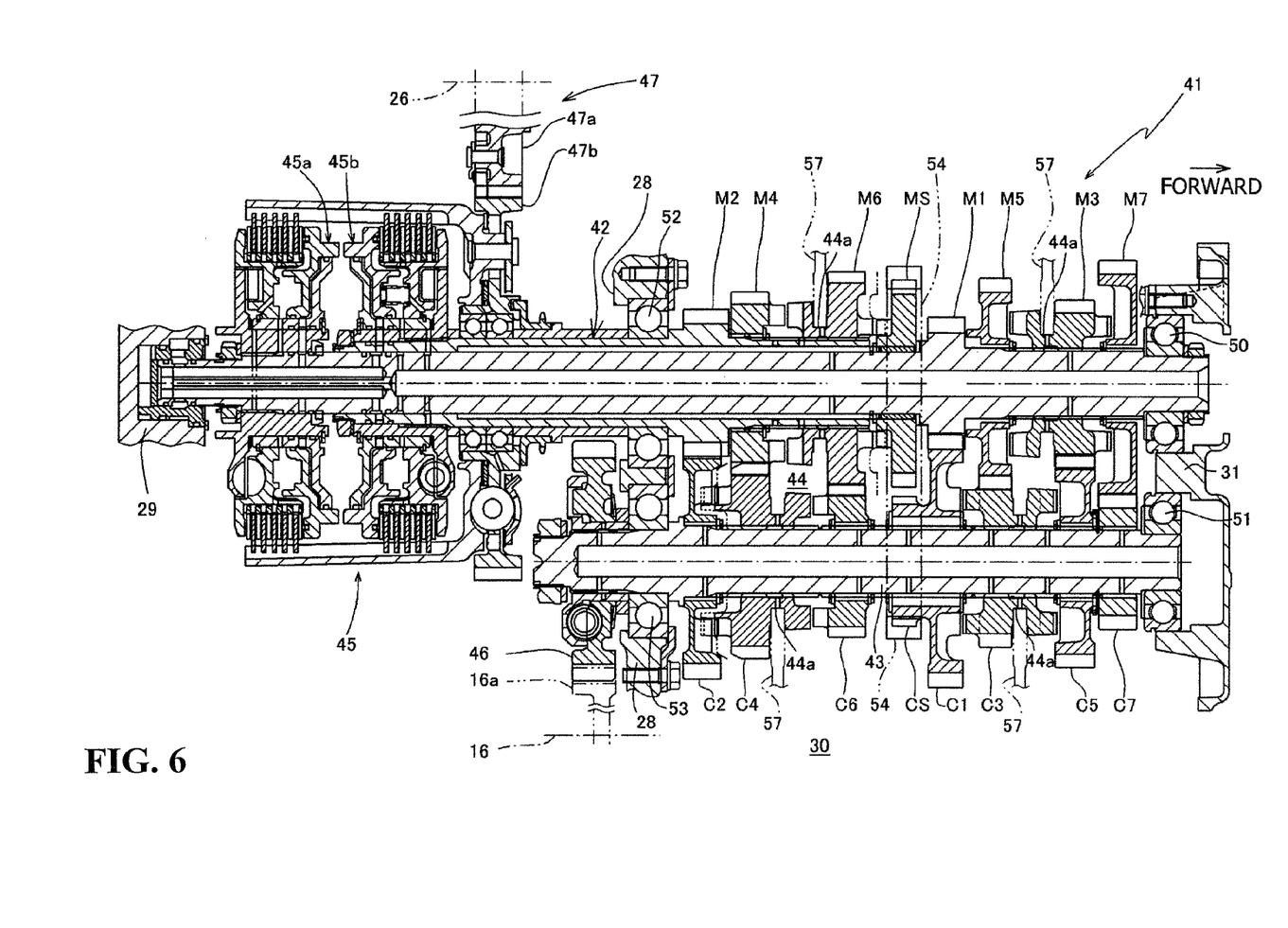
FIG. 6 is a cross-sectional view of a transmission taken along line VI-VI of FIG. 2.

FIG. 6 is a cross-sectional view of the transmission 41 taken along line VI-VI of FIG. 2.

As shown in FIG. 6, the transmission 41 includes the main shaft 42, the countershaft 43, the gear transmission mechanism 44, and a clutch mechanism 45. The clutch mechanism 45 is constructed as a dual clutch (twin clutch) having a first hydraulic clutch 45a and a second hydraulic clutch 45b that are hydraulically operated.

The main shaft 42 has an end portion rotatably supported on the transmission holder 31 by a ball bearing 50 and another end portion extending through a ball bearing 52 mounted in the rear cover 28. The main shaft 42 has a central portion rotatably supported on the rear cover 28 by the ball bearing 52.

The countershaft 43 has an end portion rotatably supported on the transmission holder 31 by a ball bearing 51 and another end portion extending through a ball bearing 53 mounted in the rear cover 28. The other end portion of the countershaft 43 is rotatably supported on the rear cover 28 by the ball bearing 53.

Seven drive transmission gears M, denoted by M1 through M7, are disposed on the main shaft 42 in an array from one of the ends of the main shaft 42 toward the central portion thereof. Seven driven transmission gears C, denoted by C1 through C7, are disposed on the countershaft 43 and are normally held in mesh with the drive transmission gears M. Reverse sprockets MS and CS are disposed respectively on the main shaft 42 and the countershaft 43 in mutually confronting positions with a chain 54 being trained around the reverse sprockets MS and CS. The drive transmission gears M, the driven transmission gears C, and the reverse sprockets MS and CS jointly make up the gear transmission mechanism 44.

The third drive transmission gear M3 and the sixth drive transmission gear M6 include shifter gears slidable on the main shaft 42 for being selectively brought into and out of engagement with the adjacent drive transmission gears M2, M4, M5, M7, or the reverse sprocket MS.

The fourth driven transmission gear C4 and the third driven transmission gear C3 include shifter gears slidable on the countershaft 43 for being selectively brought into and out of engagement with the adjacent driven transmission gears C1, C2, C5, and C6.

Each of the above shifter gears has a fork engagement groove 44a defined therein, and is axially movable by a shift fork 57 that engages in the fork engagement groove 44a.

The clutch mechanism 45, which is made up of the first hydraulic clutch 45a and the second hydraulic clutch 45b, is splined to the end portion of the main shaft 42 which extends through and beyond the rear cover 28. The other end of the main shaft 42 is rotatably supported by the clutch cover 29.

A secondary drive gear 46 is splined to the other end portion of the countershaft 43 which extends through and beyond the rear cover 28.

Power of the crankshaft 26 is transmitted through a primary drive gear 47a and a primary driven gear 47b of a speed reducer mechanism 47 to the clutch mechanism 45, which is made up of the first hydraulic clutch 45a and the second hydraulic clutch 45b. The power from the crankshaft 26 is then transmitted to the main shaft 42 when the first hydraulic clutch 45a and the second hydraulic clutch 45b are selectively engaged by a hydraulic circuit. The power transmitted from the crankshaft 26 to the main shaft 42 is transmitted to the secondary drive gear 46 through a gear stage selectively established by the gear transmission mechanism 44. The power is then transmitted through a secondary driven gear 16a and a drive axle 16 to the rear wheel 13 (see FIG. 1).

Figure 7:
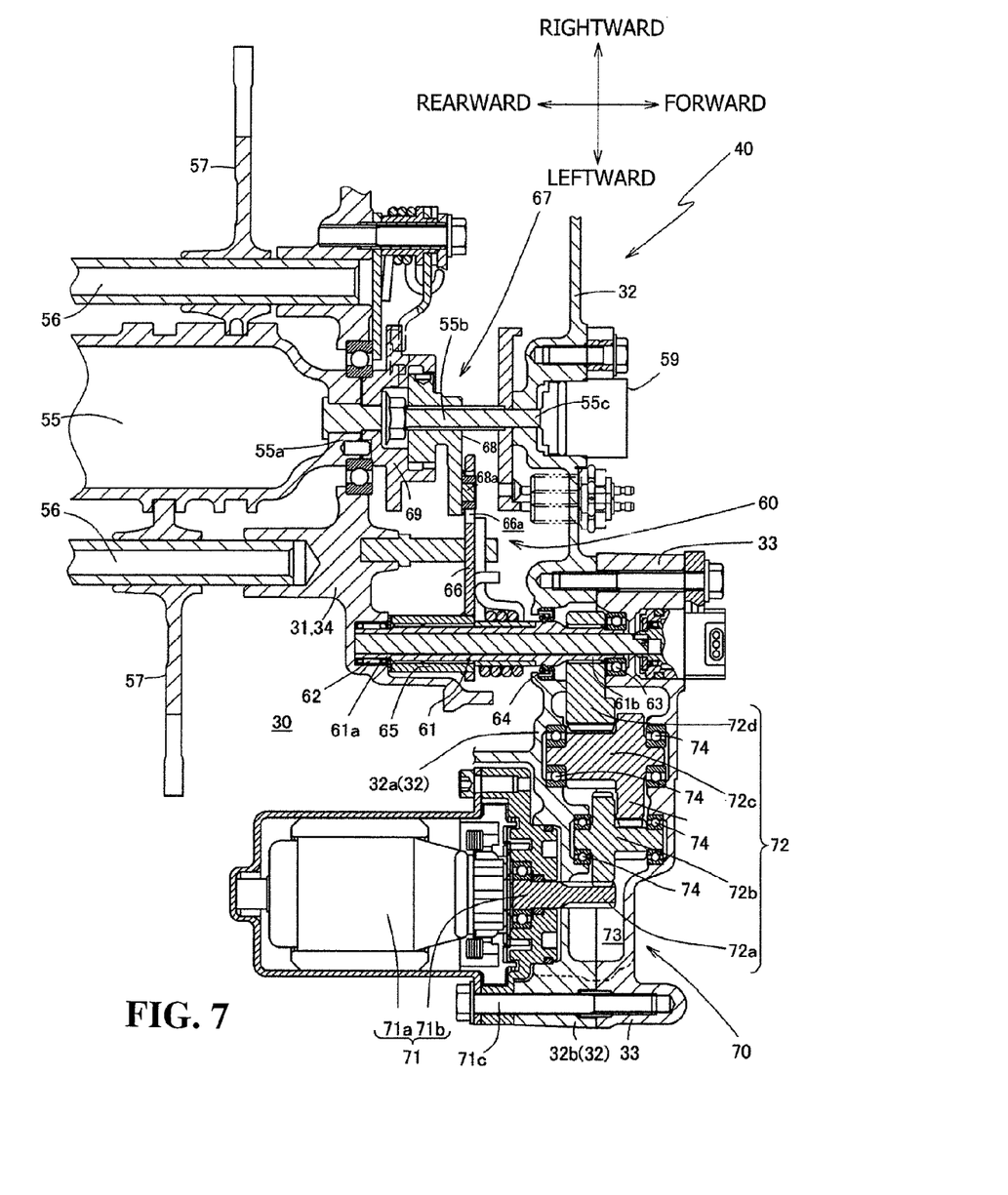
FIG. 7 is a cross-sectional view taken along line VII-VII of FIG. 2.

FIG. 7 is a cross-sectional view taken along line VII-VII of FIG. 2.

As shown in FIG. 7, the shift fork shafts 56 for support the shift forks 57 and the shift drum 55 are supported on the transmission holder 31 and the rear cover 28, and disposed in the transmission compartment 30. A shift drum shaft 55b projects in a forward direction from a front end 55a of the shift drum 55, and has a distal end 55c extending through and out of the change system holder 32 and connected to a shift position sensor 59 for detecting the gear positions of the shift drum 55.

The shift drum 55 is angularly moved by rotational power transmitted from the shift motor 71 through the change mechanism 60 to be described later, causing the shift forks 57 to move the shifter gears of the transmission 41 for thereby selectively establishing a gear stage of the transmission 41.

The electric power transmission apparatus 40, which serves as a transmission apparatus for angularly moving the shift drum 55 to move the shifter gears of the transmission 41 for thereby causing the transmission 41 to change gears, will be described below.

The electric power transmission apparatus 40 includes the change mechanism 60 for selectively establishing a gear stage of the transmission 41, the shift motor 71 for supplying rotational power to the change mechanism 60, and the speed reducer gear mechanism 72 for reducing the rotational speed of the rotational power from the shift motor 71. Power that is required to change gears is transmitted from the shift motor 71 through the speed reducer gear mechanism 72 to a shift spindle 61 of the change mechanism 60. Upon angular movement of the shift spindle 61, a master arm 66 of the change mechanism 60 is operated to angularly move the shift drum 55 intermittently, causing the shift forks 57 to move the shifter gears of the transmission 41 to switch between gear stages.

The change mechanism 60 for rotating the shift drum 55 intermittently will be described below.

As shown in FIG. 7, the change mechanism 60 includes a pawl and ratchet mechanism 67 for angularly moving the shift drum 55 intermittently, which is disposed in a front portion of the power unit P and a front portion of the transmission compartment 30, the master arm 66 angularly movable for actuating the pawl and ratchet mechanism 67, and the shift spindle 61 connected to an input mechanism 70 and angularly movable in unison with the master arm 66. When rotational power is transmitted from the shift motor 71 through the speed reducer gear mechanism 72 to the change mechanism 60, the shift spindle 61 is angularly moved, causing the master arm 66 to move angularly. Upon angular movement of the master arm 66, the pawl and ratchet mechanism 67 is actuated, causing the shift drum 55 connected to the pawl and ratchet mechanism 67 to intermittently move angularly.

As shown in FIGS. 5 and 7, the shift spindle 61 is positioned rightwardly of the shift drum 55 as seen in the front view of the vehicle, and is oriented in the longitudinal direction of the vehicle with its axis parallel to the shift drum 55.

As shown in FIG. 7, the shift spindle 61 has an end 61a angularly movably supported on the transmission holder 31 of the transmission case 34 by a needle bearing 62 and another end 61b angularly movably supported on the speed reducer cover 33 by a ball bearing 63. The shift spring 61 has a central portion angularly movably supported, at a position slightly closer to the other end, on the change system holder 32 by an oil seal 64.

The speed reducer gear mechanism 72 includes a driven gear 72d relatively angularly immovably fitted over the shift spindle 61 closely to the other end 61b. The master arm 66, to be described below, is coupled to the shift spindle 61 closely to the end 61a by an extension collar 65.

As also shown in FIG. 5, the master arm 66 is in the form of a substantially triangular plate positioned substantially axially centrally along the shift spindle 61, and is disposed so as to interconnect the shift spindle 61 and the pawl and ratchet mechanism 67 that is disposed rightwardly of the shift spindle 61.

The master arm 66 has a left portion coupled to the shift spindle 61 by the extension collar 65 for corotation with the shift spindle 61. The master arm 66 has drive hole 66a defined in a right portion thereof and coupled to the pawl and ratchet mechanism 67.

As shown in FIG. 7, the pawl and ratchet mechanism 67 includes a shift input member 68 having a driven tooth 68a slidably fitted in the drive hole 66a in the master arm 66, and an angularly movable member 69 that is angularly movable in unison with the shift drum 55. When the master arm 66 is angularly moved in one direction, the shift input member 68 is angularly moved in one direction while being guided by the driven tooth 68a sliding in the drive hole 66a. Upon the angular movement of the shift input member 68, the angularly movable member 69 is angularly moved intermittently, causing the shift drum 55 that is angularly movable in unison with the angularly movable member 69 to intermittently move angularly.

The speed reducer gear mechanism 72 for reducing the rotational speed of the rotational power supplied from the shift motor 71 and transmitting the rotational power at the reduced rotational speed to the change mechanism 60 will be described below.

As shown in FIG. 7, the rotational power supplied from the shift motor 71 has its rotational speed reduced by the speed reducer gear mechanism 72, and the rotational power is transmitted at the reduced rotational speed to the change mechanism 60.

As described above, the speed reducer compartment 73 is defined between the speed reducer holder 32a of the change system holder 32 and the speed reducer cover 33, and the speed reducer gear mechanism 72 is housed in the speed reducer compartment 73 and covered with the speed reducer cover 33. As shown in FIGS. 4, 5, and 7, the speed reducer holder 32a has the protrusion 32b, and the speed reducer gear mechanism 72 has a right half positioned in overlapping relation to the transmission compartment 30 as seen in the front view of the vehicle and a left half protruding leftwardly from the transmission holder 31 provided by the transmission case 34, and is disposed in a forward direction of the transmission compartment 30 as seen in a side view of the vehicle.

As shown in FIGS. 4 and 5, the speed reducer gear mechanism 72 is displaced leftwardly to one side in the widthwise direction of the vehicle off a widthwise center L3 of the front wheel 9, which is aligned with a widthwise center of the vehicle. Therefore, the speed reducer gear mechanism 72 is spaced from the front wheel 9 by a greater clearance than if the speed reducer gear mechanism 72 is disposed immediately behind the front wheel 9.

As shown in FIGS. 5 and 7, the speed reducer gear mechanism 72 that is housed in the speed reducer compartment 73 includes a drive gear 72a integral with a motor shaft 71b of the shift motor 71, a first gear 72b made up of large and small gears, a second gear 72c made up of large and small gears, and a driven gear 72d. These gears have rotational axes lying parallel with the shift spindle 61.

As shown in FIG. 7, the first gear 72b and the second gear 72c are angularly movably supported by ball bearings 74 on the speed reducer holder 32a and the speed reducer cover 33 which define the speed reducer compartment 73 therebetween. The drive gear 72a and the first gear 72b, the first gear 72b and the second gear 72c, and the second gear 72c and the driven gear 72d are normally held in mesh with each other, so that the rotational drive power of the shift motor 71 can be transmitted from the drive gear 72a to the driven gear 72d at a reduced speed.

As shown in FIGS. 5 and 7, the shift motor 71 partly overlaps the speed reducer gear mechanism 72 as seen in the front view of the vehicle, and is disposed closely to the change mechanism 60.

As shown in FIG. 7, the shift motor 71 includes a main motor body 71a and the motor shaft 71b that projects in a forward direction from the main motor body 71a. The drive gear 72a of the speed reducer gear mechanism 72 is integral with the distal end of the motor shaft 71b.

As shown in FIGS. 3, 4, and 6, the shift motor 71 has the motor shaft 71b longitudinally oriented parallel to the crank shaft 26 and extending into the speed reducer compartment 73 from a rear surface of the protrusion 32b of the speed reducer holder 32a on the left end of the change system holder 32. The shift motor 71 is fastened to the rear surface of the protrusion 32b of the speed reducer holder 32 by a bolt 71c inserted from behind.

As shown in FIG. 4, the shift motor 71 is disposed in a space that is surrounded, as viewed in plan, by a left front end surface 23c that interconnects the front left side surface 23a and the rear left side surface 23b of the left crankcase 23L, the front left side surface 23a of the left crankcase 23L, and the protrusion 32b of the change system holder 32. Therefore, the main motor body 71a of the shift motor 71 is positioned rearwardly of the speed reducer gear mechanism 72 and disposed in overlapping relation to the transmission compartment 30 as seen in the side view of the vehicle. Consequently, the shift motor 71 does not project in a forward direction of the power unit P, so that a clearance is kept between the front wheel 9 and the shift motor 71 and the electric power transmission apparatus 40 is rendered compact.

As seen in the front view of the vehicle, the main motor body 71a of the shift motor 71 is covered substantially in its entirety with the speed reducer cover 33. Therefore, the shift motor 71 is protected by the speed reducer cover 33 from pebbles which may come flying from the front wheel 9 that is positioned in a forward direction of the shift motor 71.

Furthermore, as shown in FIG. 2, the shift motor 71 is disposed inwardly of an outer edge, as seen in the front view of the vehicle, of the left crankcase 23L in the lower portion of the power unit P. The change mechanism 60, the speed reducer gear mechanism 72, and the shift motor 71 that make up the electric power transmission apparatus 40 are clustered in the front portion of the power unit P at the center of the vehicle in the widthwise direction thereof, making it possible to render the electric power transmission apparatus 40 compact. A bank angle that is formed by the motorcycle 2 at the time the motorcycle 2 makes a turn is not limited by the shift motor 71, and hence is kept as desired.

As shown in FIGS. 5 and 7, the change mechanism 60 and the speed reducer gear mechanism 72 are disposed in a forward direction of the transmission compartment 30, and the shift motor 71 is disposed rearwardly of the speed reducer gear mechanism 72 in partly overlapping relation thereto as seen in the front view of the vehicle. Therefore, the electric power transmission apparatus 40 that includes the change mechanism 60, the speed reducer gear mechanism 72, and the shift motor 71 is disposed closely to the front portion of the power unit P, and is rendered compact.

As shown in FIG. 4, the shift motor 71 is positioned behind the front wheel 9. As described above, the speed reducer gear mechanism 72 is displaced leftwardly to one side in the widthwise direction of the vehicle off the widthwise center of the front wheel 9, which is aligned with the widthwise center of the vehicle. Therefore, a greater clearance is provided between the front wheel 9 and the shift motor 71 that is disposed behind the front wheel 9 and the speed reducer gear mechanism 72 than if the speed reducer gear mechanism 72 is disposed immediately behind the front wheel 9.

The front wheel 9 of the motorcycle 2 has an arcuate outer edge near the power unit P as viewed in plan. Consequently, as the speed reducer gear mechanism 72 is displaced leftwardly to one side in the widthwise direction of the vehicle off the widthwise center of the front wheel 9, the clearance between the front wheel 9 and the speed reducer gear mechanism 72 as well as the shift motor 71 disposed behind the speed reducer gear mechanism 72 is further increased.

As described above, the change mechanism 60 is disposed in a forward direction of the transmission compartment 30 between the transmission holder 31 and the change system holder 32, and the shift motor 71 and the speed reducer gear mechanism 72 are disposed on the speed reducer holder 32a of the change system holder 32. Consequently, when the cassette unit referred to above is constructed, the change mechanism 60, the speed reducer gear mechanism 72, the shift motor 71, the change system holder 32, and the speed reducer cover 33 may be assembled compactly together on the front surface of the transmission holder 31 of the transmission case 34. Therefore, the transmission 41, the shift drum 55, the shift fork shafts 56, the shift forks 57, the change mechanism 60, the speed reducer gear mechanism 72, and the shift motor 71 may be installed together as a large cassette unit on the crankcase 23. These components as well as the change system holder 32 and the shift motor 71 may be unitized (sub-assembled) and installed on the crankcase 23.

The above embodiment of the present invention offers the following advantages.

The speed reducer gear mechanism 72 for transmitting the rotational power from the shift motor 71 at a reduced speed to the change mechanism 60 and the change mechanism 60 for selectively establishing a gear stage of the transmission 41 are disposed in a forward direction of the transmission compartment 30 that houses the transmission 41 therein, and the shift motor 71 is disposed rearwardly of the speed reducer gear mechanism 72. Therefore, the shift motor 71 does not project in a forward direction of the power unit P, with the clearance being kept between the front wheel 9 and the shift motor 71. The change mechanism 60 and the speed reducer gear mechanism 72 are clustered in a forward direction of the transmission compartment 30, and the shift motor 71 is disposed behind and partly overlaps the speed reducer gear mechanism 72 as seen in the front view of the vehicle. Therefore, the change mechanism 60, the speed reducer gear mechanism 72, and the shift motor 71 which make up the electric power transmission apparatus 40 are clustered in the front portion of the power unit P, making it possible to render the electric power transmission apparatus 40 compact.

The shift motor 71 has its main motor body 71a disposed in overlapping relation to the transmission compartment 30 as seen in the side view of the vehicle. The main motor body 71a thus does not project in a forward direction of the transmission compartment 30, so that the clearance is kept between the front wheel 9 and the shift motor 71. The electric power transmission apparatus 40 can thus be further rendered compact along the longitudinal direction of the vehicle.

The speed reducer gear mechanism 72 includes the speed reducer cover 33 that covers the speed reducer gear mechanism 72, and the shift motor 71 has a portion covered with the speed reducer cover 33 as seen in the front view of the vehicle. Consequently, there is no need for a separate cover member for protecting the shift motor 71. Thus, the speed reducer cover 33 is effective to protect the shift motor 71 from pebbles and debris that may come flying from the front wheel 9.

The speed reducer cover 33 doubles as a cover for the shift motor 71. Therefore, the shift motor 71 and the speed reducer gear mechanism 72 can be rendered compact, making it possible to render the electric power transmission apparatus 40 further compact.

Since the speed reducer gear mechanism 72 is displaced to the left to one side in the widthwise direction of the vehicle off the widthwise center of the front wheel 9, which is aligned with the widthwise center of the vehicle, the components of the electric power transmission apparatus 40 are clustered in the front portion of the power unit P, while maintaining the clearance between the front wheel 9 and the shift motor 71 that is disposed behind the speed reducer gear mechanism 72.

Inasmuch as the shift motor 71 is disposed inwardly of the outer edge, as seen in the front view of the vehicle, of the crankcase 23 that is positioned in the lower portion of the power unit P, the electric power transmission apparatus 40 can be rendered further compact. The bank angle that is formed by the vehicle at the time the vehicle makes a turn is not limited by the shift motor 71, and thus is kept as desired.

Although the embodiment of the present invention has been described above with reference to the drawings, the embodiment is not limited to the details described above, but may be changed or modified without departing from the scope of the invention.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A saddle-riding vehicle comprising:
a power unit including an internal combustion engine and a transmission coupled to the internal combustion engine;
a vehicle body frame supporting said power unit with a crankshaft oriented in longitudinal direction of the vehicle;
a front fork steerably supported on said vehicle body frame;
a front wheel rotatably supported on said front fork;
a transmission compartment defined in said power unit and housing said transmission therein;
a shift motor for supplying rotational power;
a speed reducer gear mechanism for reducing the speed of the rotational power from said shift motor having a first end connected to the shift motor; and
a master arm having a first end connected to a second end of the speed reducer gear mechanism and a second end connected to a shift drum of the transmission,
wherein angular movement of the speed reducer gear mechanism creates angular movement of the shift drum by being transmitted through the master arm,
wherein a main motor body of said shift motor is disposed in overlapping relation to said transmission compartment as viewed in a side elevation of the vehicle,
wherein said speed reducer gear mechanism includes a speed reducer cover covering said speed reducer gear mechanism, and
wherein said shift motor has a portion covered with said speed reducer cover as seen in a front view of the vehicle.

2. The saddle-riding vehicle according to claim 1, wherein said speed reducer gear mechanism is displaced to one side in a widthwise direction of the vehicle off a widthwise center of said front wheel.

3. The saddle-riding vehicle according to claim 2, wherein said shift motor is disposed inwardly of an outer edge, as seen in a front view of the vehicle, of a lower portion of said power unit.

4. The saddle-riding vehicle according to claim 1, wherein said shift motor is disposed inwardly of an outer edge, as seen in a front view of the vehicle, of a lower portion of said power unit.

5. A saddle-riding vehicle comprising:
a power unit including an internal combustion engine and a transmission coupled to the internal combustion engine;

a vehicle body frame supporting said power unit with a crankshaft oriented in longitudinal direction of the vehicle;
a front fork steerably supported on said vehicle body frame;
a front wheel rotatably supported on said front fork;
a transmission compartment defined in said power unit and housing said transmission therein;
a change mechanism disposed in a forward direction of said power unit, for selectively establishing a gear stage of said transmission; and
a shift motor for supplying rotational power to said change mechanism,
wherein said shift motor is disposed rearwardly of said front wheel,
wherein a speed reducer gear mechanism for reducing the speed of the rotational power from said shift motor is disposed in a forward direction of said transmission compartment,
wherein said shift motor is disposed such that a main motor body thereof is positioned rearwardly of said speed reducer gear mechanism,
wherein said speed reducer gear mechanism includes a speed reducer cover covering said speed reducer gear mechanism, and
wherein said shift motor has a portion covered with said speed reducer cover as seen in a front view of the vehicle.

6. The saddle-riding vehicle according to claim 5, wherein said speed reducer gear mechanism is displaced to one side in a widthwise direction of the vehicle off a widthwise center of said front wheel.

7. The saddle-riding vehicle according to claim 5, wherein said shift motor is disposed inwardly of an outer edge, as seen in a front view of the vehicle, of a lower portion of said power unit.

8. A saddle-riding vehicle comprising:
a front wheel rotatably supported on a front fork of the vehicle;
a transmission operatively connected to a power unit with a transmission compartment for housing said transmission therein;
a change mechanism disposed in a forward direction of said power unit, for selectively establishing a gear stage of said transmission;
a shift motor for supplying rotational power to said change mechanism;
said shift motor being disposed rearwardly of said front wheel and positioned closely to said change mechanism;
a speed reducer gear mechanism for reducing the speed of the rotational power from said shift motor disposed in a forward direction of said transmission compartment; and
said shift motor is disposed such that a main motor body thereof is positioned rearwardly of said speed reducer gear mechanism,
wherein said speed reducer gear mechanism includes a speed reducer cover covering said speed reducer gear mechanism, and
wherein said shift motor has a portion covered with said speed reducer cover for protecting the shift motor from debris flying from the front wheel.

9. The saddle-riding vehicle according to claim 8, wherein a main motor body of said shift motor is disposed in overlapping relation to said transmission compartment as viewed in a side elevation of the vehicle.

10. The saddle-riding vehicle according to claim 9, wherein said speed reducer gear mechanism is displaced to one side in a widthwise direction of the vehicle off a widthwise center of said front wheel.

11. The saddle-riding vehicle according to claim 9, wherein said shift motor is disposed inwardly of an outer edge, as seen in a front view of the vehicle, of a lower portion of said power unit.

12. The saddle-riding vehicle according to claim 8, wherein said speed reducer gear mechanism is displaced to one side in a widthwise direction of the vehicle off a widthwise center of said front wheel.

13. The saddle-riding vehicle according to claim 8, wherein said shift motor is disposed inwardly of an outer edge, as seen in a front view of the vehicle, of a lower portion of said power unit.

* * * * *